(12) United States Patent
Zenkus

(10) Patent No.: US 12,219,900 B2
(45) Date of Patent: Feb. 11, 2025

(54) APPARATUS FOR CUTTING VEGETATION

(71) Applicant: ECHO INCORPORATED, Lake Zurich, IL (US)

(72) Inventor: Joseph John Zenkus, Lake in the Hills, IL (US)

(73) Assignee: ECHO INCORPORATED, Lake Zurich, IL (US)

( * ) Notice: Subject to any disclaimer, the term of this patent is extended or adjusted under 35 U.S.C. 154(b) by 802 days.

(21) Appl. No.: 17/395,755

(22) Filed: Aug. 6, 2021

(65) Prior Publication Data

US 2022/0039321 A1 Feb. 10, 2022

Related U.S. Application Data

(60) Provisional application No. 63/062,189, filed on Aug. 6, 2020.

(51) Int. Cl.
| | |
|---|---|
| A01D 75/18 | (2006.01) |
| A01D 34/73 | (2006.01) |
| A01D 34/82 | (2006.01) |
| A01D 101/00 | (2006.01) |

(52) U.S. Cl.
CPC ......... *A01D 75/185* (2013.01); *A01D 34/733* (2013.01); *A01D 34/828* (2013.01); *A01D 2101/00* (2013.01)

(58) Field of Classification Search
CPC .. A01D 75/185; A01D 34/733; A01D 34/828; A01D 2101/00
See application file for complete search history.

(56) References Cited

U.S. PATENT DOCUMENTS

| | | | | |
|---|---|---|---|---|
| 3,940,910 | A | * | 3/1976 | d'Acremont ........... A01D 43/10 56/14.4 |
| 4,511,023 | A | * | 4/1985 | Nagai ..................... F16D 67/02 192/18 R |
| 4,761,940 | A | * | 8/1988 | Wolff .................. A01D 34/664 56/238 |
| 5,012,635 | A | * | 5/1991 | Walters ............... A01D 34/665 56/13.6 |

(Continued)

FOREIGN PATENT DOCUMENTS

| | | | | |
|---|---|---|---|---|
| EP | 1211924 B1 | * | 9/2004 | ........... A01D 34/736 |
| GB | 2159684 A | * | 12/1985 | ............. A01D 34/74 |

(Continued)

*Primary Examiner* — Arpad Fabian-Kovacs
(74) *Attorney, Agent, or Firm* — Wood, Phillips, Katz, Clark & Mortimer

(57) ABSTRACT

A rotary vegetation cutting unit having: a frame having a drive shaft; at least one cutting element that moves with the frame; and a debris blocking assembly on the frame with a unitary part that moves relative to the frame in opposite directions around an operating axis. The unitary part is configured to deflect away from the at least one cutting element objects approaching the at least one cutting element in a radial direction. The rotary vegetation cutting unit further has a bearing assembly including: a) a bearing that guides movement between the unitary part and the shaft; and b) a holder for the bearing. The rotary vegetation cutting unit is configured so that any debris spaced radially from the rotary vegetation cutting unit is required to traverse a non-straight path to contact the bearing.

26 Claims, 9 Drawing Sheets

(56) References Cited

U.S. PATENT DOCUMENTS

| | | | | |
|---|---|---|---|---|
| 6,718,745 | B1 * | 4/2004 | Adams | A01D 34/664 |
| | | | | 56/6 |
| 8,020,363 | B1 * | 9/2011 | Barnett | A01D 34/665 |
| | | | | 56/17.4 |
| 2002/0157366 | A1 * | 10/2002 | Preipke | A01D 75/182 |
| | | | | 56/6 |
| 2003/0136218 | A1 * | 7/2003 | Wohlford | A01D 34/664 |
| | | | | 74/606 R |
| 2016/0278287 | A1 * | 9/2016 | Kasai | A01D 34/736 |
| 2018/0295775 | A1 * | 10/2018 | Kang | A01D 34/733 |
| 2019/0274245 | A1 * | 9/2019 | Fuse | A01D 34/733 |

FOREIGN PATENT DOCUMENTS

| | | | | |
|---|---|---|---|---|
| WO | WO-2012034872 A1 * | 3/2012 | | A01D 34/664 |
| WO | WO-2017012805 A1 * | 1/2017 | | A01D 34/664 |
| WO | WO-2021225494 A1 * | 11/2021 | | A01D 34/008 |

* cited by examiner

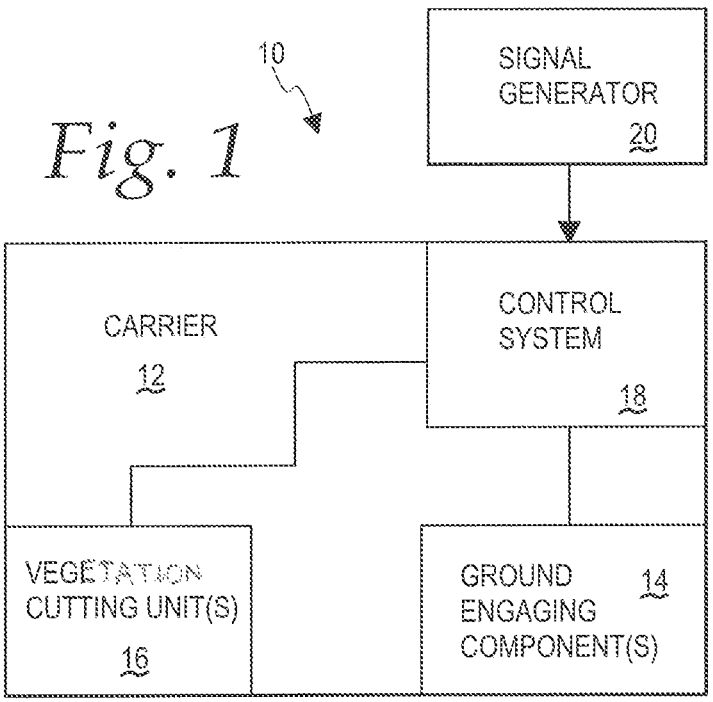
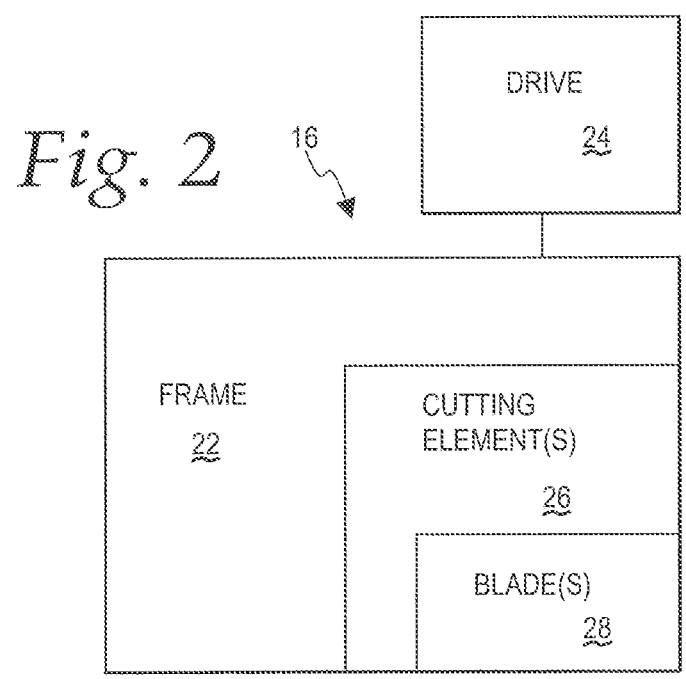

APPARATUS FOR CUTTING VEGETATION

BACKGROUND OF THE INVENTION

Field of the Invention

This invention relates to vegetation cutting apparatus and, more particularly, to a vegetation cutting apparatus having a rotating unit/head with at least one cutting component thereon.

Background Art

As grass cutting technology continues to evolve, there is an increasing focus on improving unmanned/robotic mower designs. Different forms of this technology already exist, most of which navigate by processing GPS signals, or generated dedicated signals, to control travel perimeters and paths.

The technology has advanced to the point that robotic mowers are now being employed at golf facilities—courses and ranges alike—where there are large expanses of grass that must be kept at or below a certain height. The challenge to mower designers is increased by the contoured terrain, myriad structures and landscape areas that must be navigated around, and commonly encountered, as well as unexpected, debris of all types that must be contended with, typical to the areas that must be mowed on courses.

In one known form, a mower unit has a wheeled frame that advances over the underlying terrain, with the frame supporting a plurality of rotary units/heads, each with a similar construction, that cooperate to cut a swath as the frame is advanced.

Certain restrictions have been placed on these unmanned mowers to minimize the likelihood of damage to property or injury to persons that encounter the mower while in operation. For example, restrictions have been placed on the magnitude of force that can be generated by an exposed, sharpened, grass cutting edge. This led to the adoption of a design wherein multiple, generally flat, blades are mounted at circumferentially spaced locations, with each such blade pivotable around an independent axis offset from and parallel to the main operating axis for the unit/head. The blades reside in a volume between axially spaced, generally flat, components configured such that the blades, including a mounting region for each, are at least partially shielded from above and below. The cutting edges are exposed at the annular perimeter region of this volume to allow engagement with the vegetation to be severed as the mower is advanced.

In one existing form, the blade receiving volume is bounded by an upper driven plate component and a lower debris deflecting component, with the latter movable freely in opposite directions around the operating axis relative to a drive shaft on which components are supported. While the deflecting component can be made for different types of debris, it is commonly customized in the golf course model to deflect golf balls away from the cutting blades to thereby avoid unwanted contact therebetween that might damage the blades and/or the golf balls encountered.

In one known design, each of the spaced cutting blades is connected to the frame by a fastener extended axially, with respect to the main operating axis for the unit/head, through the driven plate component. The fasteners, to be tightened and loosened, require parts thereof to be manipulated both from the top of the driven plate component and from within the blade receiving volume between the driven and deflecting components. Thus, when it becomes necessary to install or replace the blades, the unit/head may have to be separated from the mower frame and disassembled. Alternatively, with access openings formed through the deflecting plate component, awkward handling of multiple fastening components associated with each blade may be required.

This same design creates a significant amount of inconvenience when additional regular maintenance is undertaken on the mower. Since the mower will be operated in many different environments and in many different weather conditions, it is common for there to be a progressive accumulation of debris such as grass and compacted dirt in the volume between the driven plate component and the primary deflecting component which may eventually impair operation of the cutting head if not removed.

Further, a bearing is typically placed to act between the debris deflecting component and the driving shaft. The bearing is likewise exposed within the volume between the driven and deflecting plates and is thus prone to having debris buildup thereon that may eventually accumulate to the point that either the bearing ceases up and must be cleaned or replacement becomes necessary. This bearing is generally accessible only with the associated deflecting component separated from the driven component, whereupon fasteners connecting the bearing to the deflecting component can be accessed. Several steps, involving manipulation of many fasteners, are commonly required to be performed with prior art designs to effect the disassembly required to access the bearing.

Aside from the expense associated with keeping on hand replacement bearings, the replacement process may be time consuming and challenging given the layout of components on the unit/head.

In certain environments, some level of cleaning, that also requires disassembly of components, may be a frequently required activity. With a mower having multiple rotary heads and the aforementioned design, the cleaning process may be time consuming, demanding employee time and taking away from operational time for the mower.

In known designs, the primary debris deflecting component is made from a metal material. Generally, metal parts are more expensive than parts that are made using a non-metal material and this expense may be significant when replacement of multiple debris deflecting components is anticipated to be required fairly regularly with a continuously operating mower.

Further, metal parts, if made from a material that rusts, may have to be replaced more frequently since they will be commonly operating in a damp environment. Parts made from lightweight metal material, such as aluminum, which does not rust, may be more prone to failure through cracking, bending, etc. since it is anticipated that some potentially heavy debris, such as rocks, may be regularly encountered. Generally, metal parts designed for this purpose are sufficiently rigid that repeated impacts with foreign objects may cause bending, fracture, and other distortions that may render the debris deflecting component ineffective or inoperative. This is particularly true since the primary deflecting component is commonly made in a thin plate form in existing structures. Regardless of the metal utilized, such thin constructions are prone to becoming physically altered, which may compromise their performance and/or that of the cutting elements, or necessitate replacement.

The above problems are magnified due to the fact that mowers on golf courses may be operated continuously, with interruptions only for recharging in the case of battery powered units.

Further, metal debris deflecting components with sufficient integrity to remain intact for extended periods generally have locally sharp regions that may tend to damage objects, such as encountered golf balls on courses.

Still further, it is desirable to have the bottommost region of the units/heads designed to have good wear characteristics together with a degree of resiliency that allows absorption of impacts as when encountering hard ground regions or debris. Heretofore, a dedicated impact component has been incorporated into the main metal deflecting component for this purpose. This may result in a more expensive construction and may complicate manufacture and disassembly and reassembly as maintenance is performed on the head, as in removing debris, changing blades, changing the deflecting component, etc.

Regardless of how the impact capability is incorporated, separation of the deflecting component, as for replacement, generally requires a series of disassembly steps involving handling of a number of separate components which must be handled and manipulated again to effect re-assembly of the unit/head.

As the robotic mower technology continues to evolve, the need for durable, reliable, and affordable designs continues to be a focus of designers. Affordability is a significant consideration in terms of the initial purchase investment as well as ongoing upkeep of the equipment.

SUMMARY OF THE INVENTION

In one form, the invention is directed to a rotary vegetation cutting unit having a top and bottom and including: a frame having a shaft that is driven to cause the frame to move around an operating axis as the rotary vegetation unit is operated; at least one cutting element that moves with the frame around the operating axis to sever vegetation as the rotary vegetation cutting unit is operated and advanced in a cutting path along underlying terrain; and a debris blocking assembly on the frame with at least one component defining a unitary part that moves relative to the frame in opposite directions around the operating axis. The unitary part is configured to deflect away from the at least one cutting element objects approaching the at least one cutting element in a radial direction as the rotary vegetation cutting unit is advanced in a cutting path. The rotary vegetation cutting unit further has a bearing assembly including: a) a bearing that guides movement between the unitary part and the shaft; and b) a holder for the bearing on the frame. The rotary vegetation cutting unit is configured so that any debris spaced radially from the rotary vegetation cutting unit is required to traverse a non-straight path to contact the bearing.

In one form, the bearing is a sealed bearing.

In one form, the bearing has an inner race on the shaft and an outer race on the holder.

In one form, the unitary part and holder have axially overlapping portions.

In one form, the unitary part has an axial projection that blocks debris passage radially towards the bearing.

In one form, the unitary part has a first axial projection in the form of a first ring extending around the operating axis and blocking passage of debris radially towards the bearing.

In one form, the unitary part has a second axial projection in the form of a second ring extending around the first ring and blocking passage of debris radially towards the bearing.

In one form, the unitary part has a third axial projection in the form of a third ring extending around the second ring and blocking passage of debris radially towards the bearing.

In one form, the holder has a surface configured to cooperate with a surface on the unitary part and key the holder and unitary part against relative turning around the operating axis.

In one form, the holder has an axial projection that cooperates with the unitary part to block passage of debris radially towards the bearing.

In one form, the unitary part and holder are configured to cooperate to define a closed volume surrounding the bearing.

In one form, the unitary part has an axial projection that cooperates with an axial projection on the holder to block passage of debris radially towards the bearing.

In one form, the axial projections on the unitary part and holder have axially facing surfaces that abut.

In one form, the axial projections on the unitary part and holder have radially facing surfaces that abut.

In one form, the radially facing surfaces are complementarily curved.

In one form, the holder has an annular outturned flange.

In one form, the annular outturned flange has an annular surface portion that declines in a radially outward direction.

In one form, the holder has a wall with an annular upwardly facing surface that connects between the annular surface portion that declines and an annular outer surface on a cylindrical shape extending upwardly from the wall and around the bearing.

In one form, the holder is guided in turning around the operating axis relative to a driven part of the frame and connected to the unitary part so that the unitary part follows movement of the holder.

In one form, the unitary part extends from at or adjacent the bottom of the rotary cutting unit and has an outer edge portion defining at least part of a blocking edge assembly that is configured to deflect away from the at least one cutting element objects approaching the at least one cutting element in a radial direction as the rotary vegetation cutting unit is advanced in a cutting path.

In one form, the unitary part defines at least part of a guide surface that guides the rotary vegetation cutting unit against and past underlying terrain and/or an object on underlying terrain as the rotary vegetation cutting unit is advanced in a cutting path.

In one form, the rotary vegetation cutting unit is provided in combination with a carrier for the rotary vegetation cutting unit on which the rotary vegetation cutting unit is guidingly movable in a vertical path while maintaining a constant orientation. The guide surface extends angularly upwardly and outwardly away from the bottom of the rotary vegetation cutting unit to define a wedging region. An object encountering the wedging region exerts a wedging force upon the guide surface that tends to move the rotary vegetation cutting unit upwardly on the carrier.

BRIEF DESCRIPTION OF THE DRAWINGS

FIG. 1 is a schematic representation of a vegetation cutting system of the type into which the present invention can be incorporated;

FIG. 2 is a schematic representation of a rotary vegetation cutting unit according to the invention;

DETAILED DESCRIPTION OF THE PREFERRED EMBODIMENT

Figure 3:
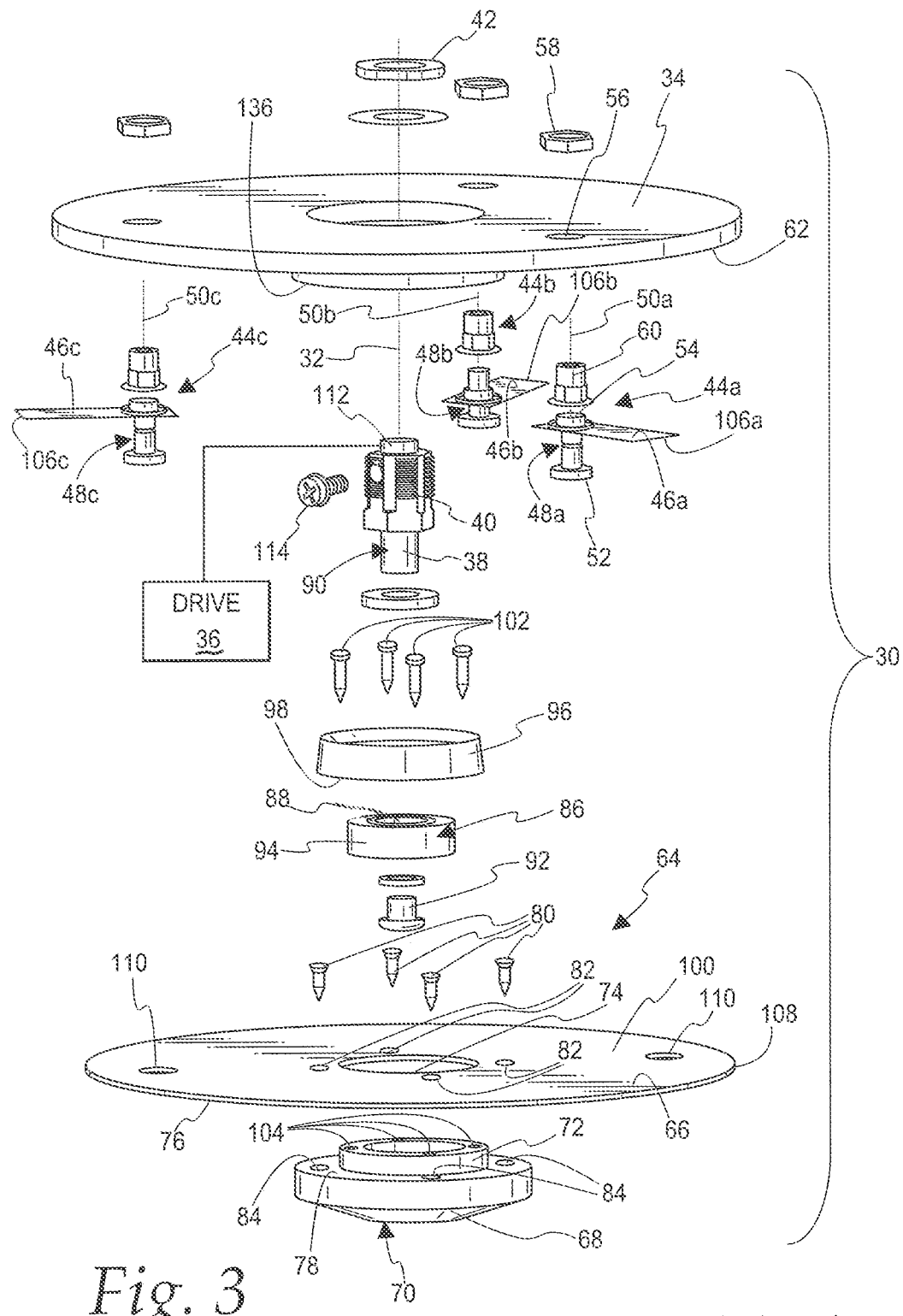
FIG. 3 is an exploded, perspective view of one form of prior art rotary vegetation cutting unit.

In FIG. 1, a vegetation cutting system, of the type into which the present invention can be incorporated, is shown schematically at 10. The system 10 consists of a carrier 12 with a frame that is moved guidingly over underlying terrain on which vegetation is to be cut. Typically, the carrier 12 will have one or more ground engaging components 14 that will guide the carrier 12 thereover. The ground engaging component(s) 14 generally will be made up of at least a number of wheels. The wheels may have a fixed orientation or, in the event of a robotic construction, one or more of the wheels will be steerable to allow the path of the carrier 12 to be controllably determined.

The carrier 12 has at least one vegetation cutting unit 16 that moves with the carrier 12 to continuously produce a cutting action on underlying vegetation as the carrier 12 is operated and moves in a cutting path.

The carrier 12 may be one that is manually controlled and maneuvered or one that is "robotically" operated. In the latter case, a control system 18 is incorporated which allows the operation of the system 10 to be effected by processing a signal from a generator 20. The signal may be a GPS signal or one generated through a system wherein signals are dedicated to the operation of the system 10.

The precise nature of the system 10 into which the vegetation cutting units 16 are incorporated is not critical to the present invention, with the generic showing intended to encompass virtually any known, or developed, vegetation cutting system.

The present invention is focused principally upon the construction of the vegetation cutting unit 16. The vegetation cutting unit 16 may take a multitude of different forms, with the basic elements thereof shown in schematic form in FIG. 2. Essentially, the vegetation cutting unit 16 consists of a frame 22 that has an operating axis around which the frame is turned by an appropriate drive 24, which is not limited in any manner in terms of its construction or operation.

The vegetation cutting unit 16 has at least one cutting element 26 that moves with the frame 22 around the operating axis to sever vegetation as the vegetation cutting unit is operated.

Each cutting element 26 may take any of an unlimited number of different forms. For purposes of explanation herein, the cutting element 26 will be described as having a blade 28 with a sharpened edge that is driven against the vegetation as the cutting element 26 turns with the frame 22.

Typically, the blades 28 will be exposed and prone to being contacted and impacted by uneven terrain and foreign objects as the carrier 12 advances the vegetation cutting unit 16 in the path of the carrier 12, which causes each individual vegetation cutting unit 16 to cut a swath as dictated by its geometry.

Existing designs have incorporated structure to partially shield the cutting elements, principally in an axial direction. This shielding is limited since strategic exposure of the cutting blade edges to a certain extent is required to allow them to effectively perform their cutting function.

In FIG. 3, an exemplary prior art rotary vegetation cutting unit is shown at 30. The vegetation cutting unit 30 has an operating axis 32 around which a main frame component 34 is driven in operation. A suitable drive 36 is connected to a shaft 38 which has an externally threaded coupler 40 secured to the frame component 34 through a complementary threaded nut 42.

In the depicted construction, there are three cutting elements 44a, 44b, 44c, corresponding to the cutting elements 26 in FIG. 2. The cutting elements 44a, 44b, 44c have blades 46a, 46b, 46c, corresponding to the blades 28, which are mounted to shafts 48a, 48b, 48c for guided movement around axes 50a, 50b, 50c. The axes 50a, 50b, 50c are spaced equidistantly from the operating axis 32 and equidistantly from each other in a circumferential direction with respect to the operating axis 32.

Each of the cutting elements 44 has a similar construction. The exemplary cutting element 44a has a headed component 52 with a threaded shaft 54 that extends through an opening 56 in the frame component 34 to engage a nut 58 at the top thereof. The shaft 54 extends through a spacer 60 which maintains the operatively situated blade 46a a desired distance below the bottom surface 62 of the frame component 34. The headed component 52 is engageable by a tool from the bottom thereof and can be turned in opposite directions around the axis 50a while controlling the nut 58, to thereby selectively secure the blade 46a in its operative position and separate the shaft 54 from the nut 58 to allow the blade 46a to be released from the frame component 34, as to be repaired or replaced. With the headed component 52 tightened, the blade 46a is supported at its cutting height and is allowed to freely turn around the axis 50a.

In this embodiment, the blade 46a has a substantially rectangular shape and accepts the shaft 54 closer to one lengthwise end, whereby as the frame component 34 is driven, centrifugal forces on the blade 46a cause the cutting blade 46a to be whipped in a following cutting direction.

The vegetation cutting unit 30 has a protective/guide assembly 64 that performs a bottom guiding function and the aforementioned shielding function.

The assembly 64 consists of a disc-shaped plate 66, typically made of metal, with a bumper component 68, separate therefrom and attached thereto, and typically made from a non-metal material than is softer and less expensive than the metal making up the plate 66.

The bumper component 68 has a convex bottom surface at 70 that moves guidingly against any underlying terrain and also, by reason of the convex shape, tends to be guided against and past encountered raised terrain or foreign objects.

The bumper component 68 has a stepped diameter which produces an upper annular ring 72 that can be passed through a complementarily-shaped opening 74 in the plate 66 to allow a bottom plate surface 76 to facially abut an annular, axially oppositely facing surface 78 on the bumper component 68 extending around the ring 72.

Threaded fasteners 80 are directed downwardly through openings 82 in the plate 66 and fixed in aligned bores 84 in the bumper component 68 to unify the plate 66 and bumper component 68.

The plate 66 and bumper component 68 are designed to move together guidingly in opposite directions around the operating axis 32 as the vegetation cutting unit 30 is operated. A bearing 86 is used to guide relative movement between the frame component 34 and the plate 66 with its associated components.

The bearing 86 has an inner race 88 that is fixed around a lower region 90 of the shaft 38 and is positively held in place by an axially extending, threaded fastener 92 that is fixed to the shaft 38.

An outer race 94 of the bearing 86 is fixed on the plate 66 through a mounting component 96 that frictionally engages the outer race. The mounting component 96 has a lower edge 98 that bears against the upper surface 100 of the plate 66. The mounting component 96 captively bears the outer race 94 against the surface 100. The mounting component 96 is fixed with respect to the plate 66 by threaded fasteners 102 that extend through bores (not shown) in the mounting component 96 and into bores 104 in the bumper component 68 in which the fasteners 102 are tightened. With this arrangement, the outer race 94 will turn with the plate 66.

The components on the vegetation cutting unit 30 are dimensioned so that, in operation, the free ends 106a, 106b, 106c of the cutting blades 46a, 46b, 46c project a predetermined distance beyond the perimeter edge 108 of the plate 66. Given that the blades 46 are relatively thin and will be prone to dulling and becoming damaged upon being impacted by foreign objects during operation, it is anticipated that the blades 46 will be regularly separated from the rest of the cutting unit 30, as to be sharpened, repaired, or replaced.

In this embodiment, access openings 110 are provided that can each be aligned over the headed components 52 to allow underside access thereto, and turning thereof, to assemble and disassemble the cutting elements 44.

As noted above, by reason of having a separate nut 58 that must be controlled, assembling and disassembling the cutting elements 44 requires that the headed component 52 be manipulated from one axial side of the frame component 34 while manipulating the nut 58 on the other side thereof. Further, having a separate nut construction raises the possibility that the nut 58 may be lost during normal operation and during maintenance.

With the vegetation cutting unit 30 assembled and being operated, a volume between the frame component surface 62 and the plate upper surface 100 is defined which is open in a radial direction to allow the cutting elements 44 to engage vegetation and sever the same. As such, grass, moisture, dirt, and other foreign material tend to migrate radially into this volume. Some of this debris may move in a straight line path to between the plate upper surface 100 and mounting component edge 98 up to the bearing 86. Small particles might find their way through this path into the bearing 36, which may lead to impairment of the bearing operation or ceasing up thereof.

Still further, over time, a progressive buildup of debris may require that the volume between the surfaces 62, 100 be cleaned. Buildup and hardening of debris may eventually necessitate separation of the plate 66 to gain full access to, and breaking up of, the accumulated debris. With this design, the protective guide assembly 64 must be removed with components intact thereon by separating the coupling 40 from the frame component 34 while at the same time coordinating release of the connection between the coupling 40 and the driving end 112 of a shaft turned by the drive 36. This involves loosening another fastener 114.

With the vegetation cutting unit 30, it also may be necessary to periodically change one or both of the plate 66 and/or bumper component 68. Given that the bumper component 68 is typically made from a softer material, it will be prone to wearing and potentially breaking away from the plate 66.

The plate 66 may likewise become damaged as by being bent, which may interfere with operation of the cutting elements 44. In fact, this damage is expected given the potentially large amounts of hard debris that is anticipated to be encountered and the typical lengthy continuous operation.

In the event that replacement is required, the entire assemblage of components, axially below and including the coupler 40, must be separated from the drive 36 and the frame component 34. This allows access to all of the components from above the plate 66, whereby the multiple fasteners 80, 92, 102 can be manipulated to isolate the plate 66 and the bumper component 68.

Figure 4:
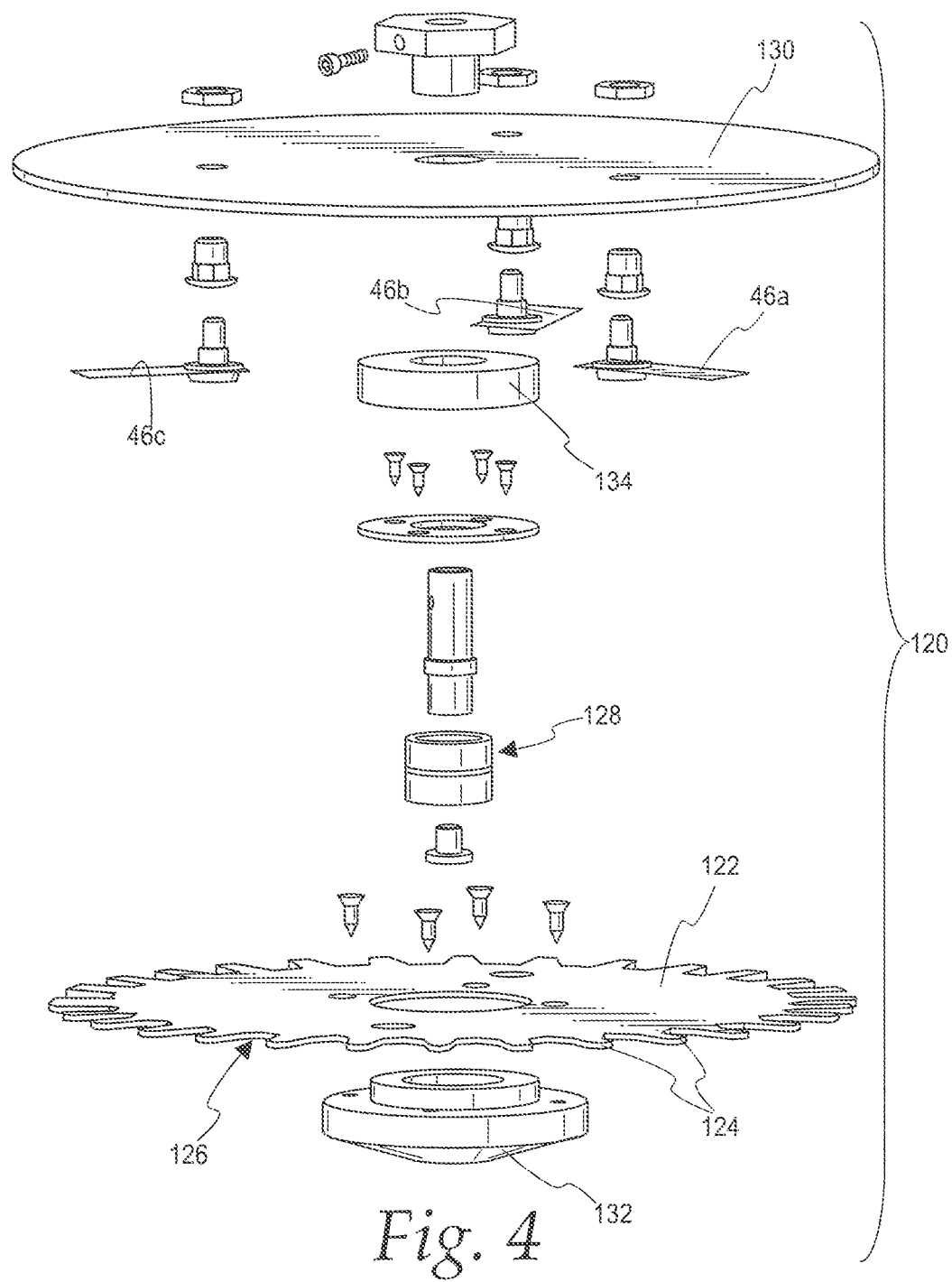
FIG. 4 is a view as in FIG. 3 of another prior art rotary vegetation cutting unit.

In FIG. 4, another prior art vegetation cutting unit is shown at 120. The vegetation cutting unit 120 is similar to the vegetation cutting unit 30 in terms of basic operation, with the primary distinction being that the plate 122, corresponding to the plate 66 in FIG. 3, has radially projecting fingers 124 formed at the outer perimeter thereof. The cutting blades 46a, 46b, 46c, have the same construction as in FIG. 3 and extend into radially overlap with a gap region at 126 between the fingers 124. The fingers 124 provide additional shielding and may also be designed to engage and deflect foreign objects having a predetermined effective diameter.

The vegetation cutting unit 120 otherwise has substantially the same component arrangement, albeit a slightly different construction, including a bearing 128 that guides turning between a frame component 130 and the plate 122, and a bumper component 132 below, and separable from, the plate 122.

The vegetation cutting unit 120 uses a spacer 134 that is separate from, and resides between, the frame 130 and plate 122 to maintain the working volume for the cutting elements, whereas in the vegetation cutting unit in FIG. 3 a spacer component 136 is formed unitarily with the frame component 34.

One form of the inventive rotary vegetation cutting unit is shown at 140 in FIGS. 5-10.

The vegetation cutting unit has a frame 142 with an operating axis 144 around which the frame 142 is driven as the vegetation cutting unit is operated.

As noted above, while there is no limitation as to the number of cutting elements, in the depicted embodiment, there are three cutting elements 146a, 146b, 146c that move with the frame 142 around the operating axis 144 to sever vegetation as the vegetation cutting unit is operated. Operation with a single cutting element is feasible.

A debris blocking assembly 148 engages debris to divert engaged debris away from the at least one cutting element 146 as the rotary vegetation cutting unit is operated.

Figure 9:
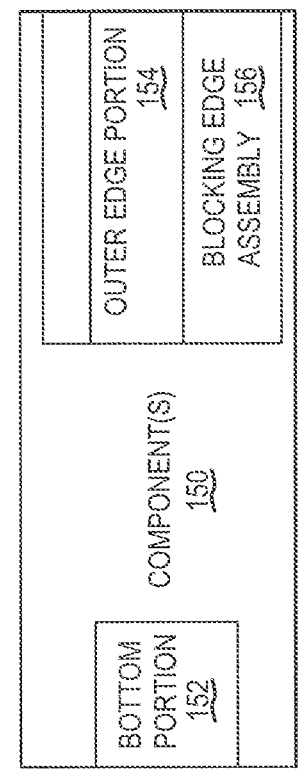
FIG. 9 is a schematic representation of a debris blocking assembly that is part of the inventive rotary vegetation cutting unit.

As depicted schematically in FIG. 9, the debris blocking assembly 148 may be made up of a single or multiple components 150. The single or multiple components act as a unitary part that moves as one piece in opposite directions around the operating axis 144. The unitary part extends from a bottom portion 152, at or adjacent the bottom of the vegetation cutting unit 140, up to an outer edge portion 154 that defines at least part of a blocking edge assembly 156, that is configured to deflect away from the at least one cutting element 146 objects approaching the at least one cutting element 146 in a radial direction as the rotary vegetation cutting unit is advanced in a cutting path.

The frame 142 consists of a disc-shaped plate 158 and a shaft 160 fixed to the plate 158. The shaft 160 has an externally threaded connecting portion 162 that can be directed upwardly through a bore 164 in the plate 158. An enlarged flange 166 on the shaft 160 has an upwardly facing surface 168 that can be drawn against the downwardly facing surface 170 on an axially recessed wall portion 171 on the plate 158. The upwardly projecting portion of the shaft has a washer 172 placed thereon followed by a nut 174 which is threaded to the connecting portion 162. The flange 166 has a polygonally-shaped outer surface to accept a tightening wrench which can be used to hold the shaft 160 as the nut 174 is tightened, thereby to fixedly secure the shaft 160 and plate 158 together.

The plate 158 has three threaded bores 178a, 178b, 178c, to threadably engage mounting bolts 180a, 180b, 180c on the cutting elements 146a, 146b, 146c.

The mounting bolts 180 have enlarged heads 182a, 182b configured to be engaged by a conventional screwdriver that allows turning thereof selectively in opposite directions to tighten and loosen the bolts 180.

Spacers 184a, 184b, 184c are provided through which each bolt 180a, 180b, 180c is axially directed.

The cutting elements 146a, 146b, 146c have sharpened cutting blades 186a, 186b, 186c with a structure similar to the cutting blades as described in the prior art structures.

As seen with the exemplary cutting element 146a, the mounting bolt 180a can be directed upwardly through the cutting blade 186a and then the spacer 184a and thereafter into the bore 178a in the plate 158. By tightening the mounting bolt 180a, the cutting blade 186a can be fixed in its operative position spaced below a downwardly facing surface 187 on the plate 158.

By reason of threading the bores 178 through the plate 158, the need for separate nuts, as in the prior art constructions in FIGS. 3 and 4, is obviated. Thus, assembly and disassembly of the cutting elements 146 is simplified in terms of number of parts required to be handled and the manner in which the parts must be manipulated to be assembled and disassembled.

The vegetation cutting unit 140 has a bearing assembly 188 made up of a bearing 190 and a holder 192 for the bearing 190 on the frame. The bearing assembly 188 guides movement between the unitary part made up of the component 150 or components and the shaft 160 which, when fixed, becomes part of the frame 142. With this arrangement, the unitary part/component 150 is movable freely and guidingly relative to the fixed portion of the frame 142 in opposite directions around the operating axis 144.

Figure 5:
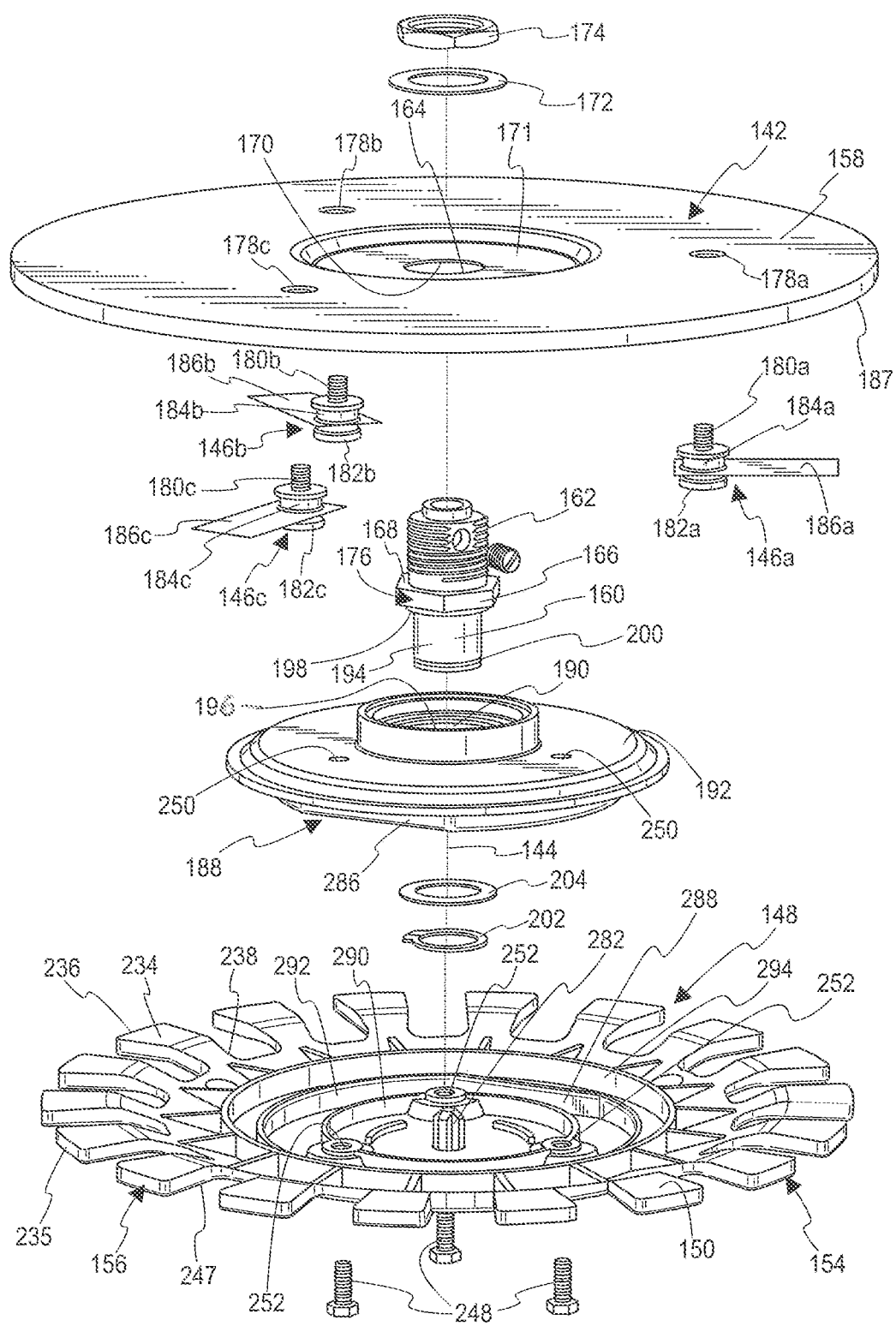
FIG. 5 is an exploded, perspective view of one form of rotary vegetation cutting unit according to the invention.

The bearing assembly 188 can be shifted upwardly from the FIG. 5 position until an inner race 196 abuts to an annular, downwardly facing surface 198 beneath the flange 166, whereupon the inner race 196 directly surrounds and is frictionally held on the shaft portion 194 to follow movement of the shaft 160 around the operating axis 144 in operation.

With the bearing assembly 188 fully upwardly moved, an annular undercut 200 on the lower shaft region 194 is exposed to receive a fastening split ring 202. A washer 204 is interposed between the split ring 202 and the bearing 190 to provide adequate holding surface contact area.

The outer race 206 of the bearing 190 is frictionally held, in this embodiment, at a surface 207 by the one piece holder 192 to follow movement thereof.

The unitary part/component 150 is in turn fixed to the frame 142/holder 192, by alternative structures as described in greater detail below, so that the holder 192 and unitary part/component 150 move as one piece around the operating axis 144.

As depicted in specific embodiments herein, the entire unitary part/component 150 is a single piece, preferably molded from a non-metal material, such as nylon. This construction is not required but is preferred for a number of reasons, including the resulting avoidance of part junctures that may admit debris.

In this embodiment, the component 150, in addition to defining the blocking edge assembly 156, defines a guide surface 208 that guides the rotary vegetation cutting unit 140 against and past underlying terrain and/or an object on underlying terrain as the operating rotary vegetation cutting unit 140 is advanced in a cutting path. In this embodiment, the component 150 defines the entire blocking edge assembly 156 that protects the cutting elements 146 from impacts by objects advancing radially towards the cutting elements 146.

In this embodiment, the component 150 also defines the downwardmost extension of the vegetation cutting unit 140. The guide surface 208 has a bottom surface portion 210, on a bottom wall 211, that is substantially flat. Alternatively, as shown in the same Figure, the surface portion 210' may be slightly convex. In either event, the surface portions 210, 210' face downwardly at the bottom of the vegetation cutting unit 140.

The guide surface portion 210 transitions into a surface portion 212 that extends angularly upwardly and outwardly away from the bottom of the rotary vegetation cutting unit 140 thereby to define at least part of a wedging region at 214.

The wedging region 214 transitions to a substantially horizontal surface portion 216 which extends up to the blocking edge assembly 154.

Figure 10:
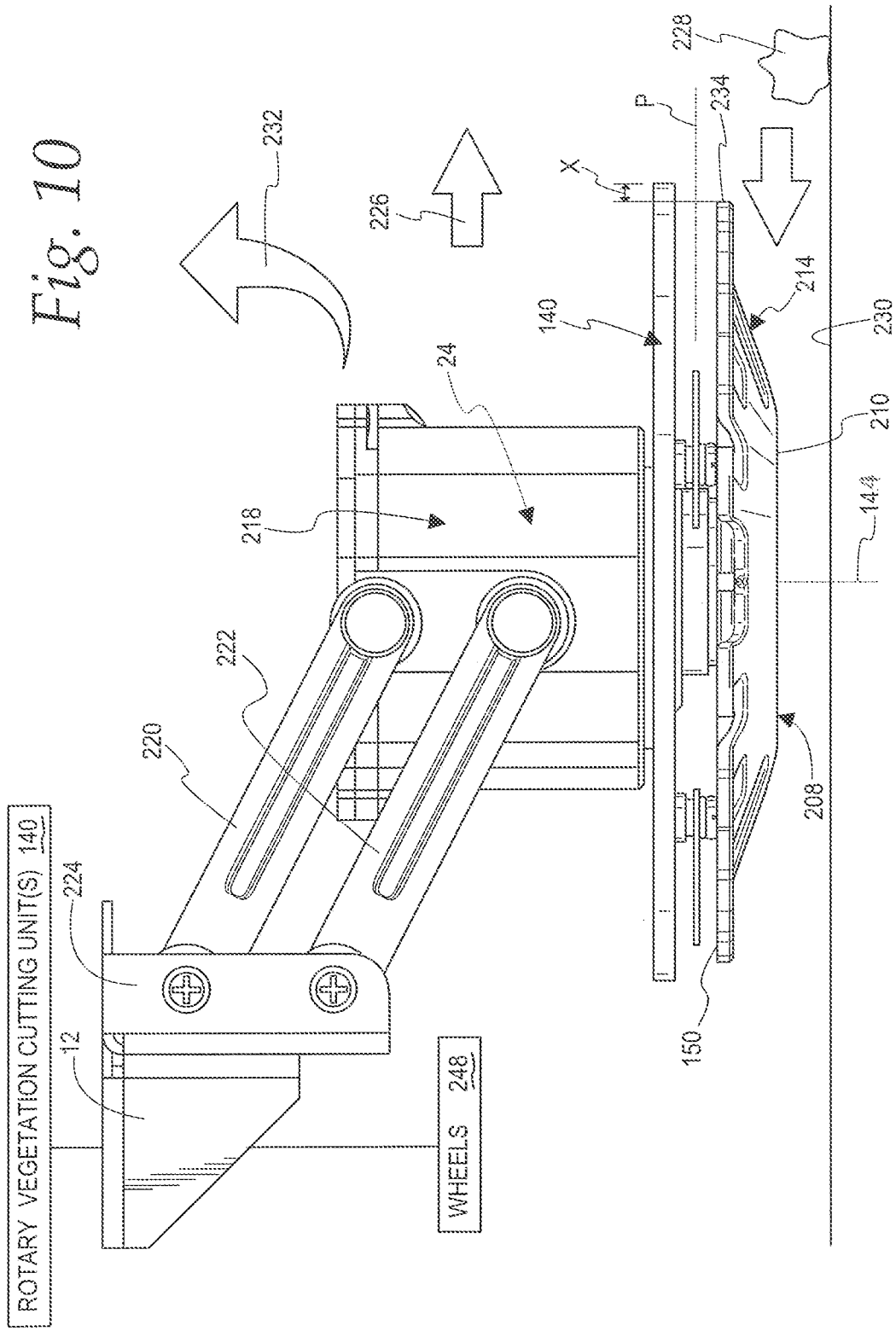
FIG. 10 is a partially schematic, side elevation view of a carrier for the inventive rotary vegetation cutting unit with one such rotary vegetation cutting unit shown operatively positioned thereon.

This specific construction is advantageous regardless of how the rotary cutting unit 148 is mounted and is particularly advantageous with the exemplary mounting shown in FIG. 10. In this embodiment, the carrier 12 supports a housing 218 which contains the drive 24 for the vegetation cutting unit 140. By using parallel links 220, 222 pivotally mounted at their opposite ends to a support 224 on the carrier 12 and the housing 218, the housing 218 is allowed to "float" vertically while maintaining a consistent orientation, as depicted. Under the weight of the housing 218 and cutting unit 140, the housing 218 and associated cutting unit 140 normally assume the depicted, predetermined position.

With the carrier 12 advanced in the direction of the arrow 226 in FIG. 10, upon encountering a foreign object, as shown at 228, the object produces a wedging action between the underlying terrain 230 and the guide surface 208, particularly at the wedging region 214, which causes the combined housing 218 and cutting unit 140 to tip up, as indicated by the arrow 232, while maintaining orientation. The object 228 can then pass under, against, and past the guide surface portion 210 until the vegetation cutting unit 140 eventually moves fully clear of the obstruction.

In this embodiment, the component 150 has a plurality of radially projecting fingers 234 that are spaced circumferentially around the operating axis 144, with each finger having a free end 235 at which discrete edges 236 are defined, with the discrete spaced edges 236 collectively and cooperatively defining the blocking edge assembly 156.

The component 150 defines receptacles 238 between adjacent fingers 234, with each receptacle as shown substantially U-shaped and opening radially outwardly. As seen most clearly in FIG. 7, cutting edges 240 on the cutting elements 146 are sharpened and radially overlap with the receptacles 238 to sever vegetation that moves into these receptacles 238 during operation.

The free ends of the adjacent fingers 234 are spaced from each other to define a radial entry opening at 242 with an effective circumferential dimension O less than a diameter of a particular type of debris that may be targeted to be blocked.

In the depicted embodiment, the component 150 is designed to deflect a conventional golf ball 244 that has a diameter D greater than the dimension O.

The component 150, in conjunction with the plate 158, bounds a volume 245 axially therebetween within which the cutting blades 186 reside.

Figure 6:
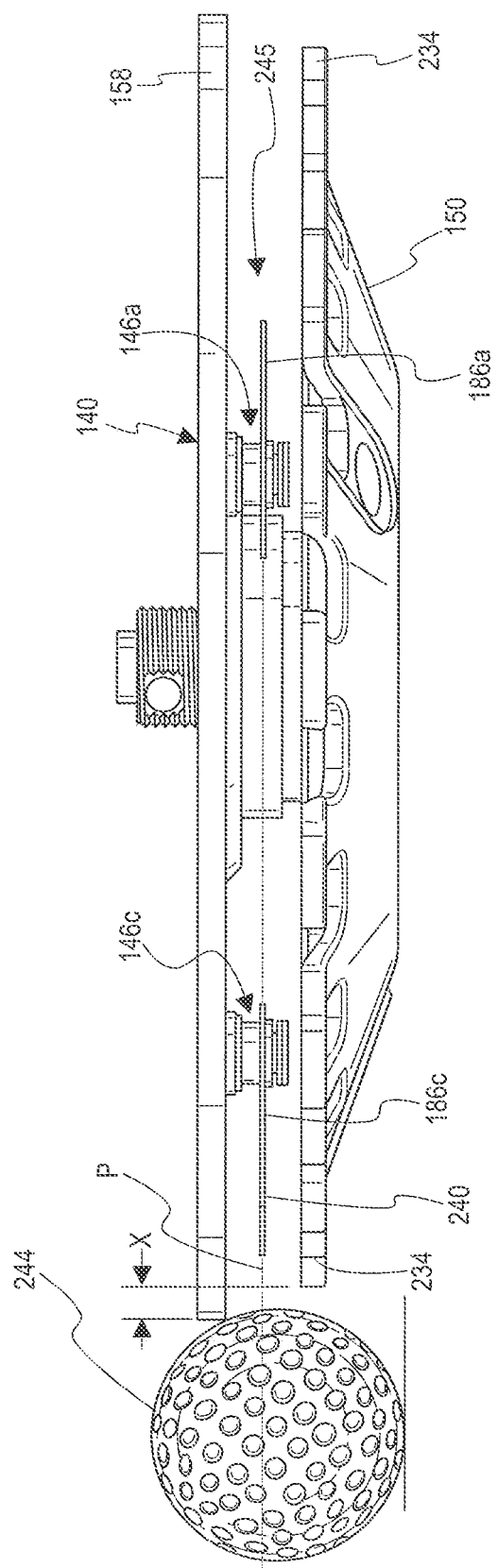
FIG. 6 is a side elevation view of the rotary vegetation cutting unit in FIG. 5 in an assembled state.

As seen clearly in FIGS. 6 and 10, the cutting blades 186 move within the volume 245 in a path approximated by a plane P that is spaced above the component 150.

As also seen in these same Figures, the fingers 234 occupy a volume spaced above the bottom of the vegetation cutting unit 140.

The component 150 has discrete openings 246, which in this case each is an extension of a receptacle 238 between fingers 234, alignable with the heads 182 on the mounting bolts 180 to facilitate turning thereof from the underside of the vegetation cutting unit 140. In this embodiment, the openings 246 are registrable simultaneously with all three of the heads 182, which is not a requirement.

Figure 7:
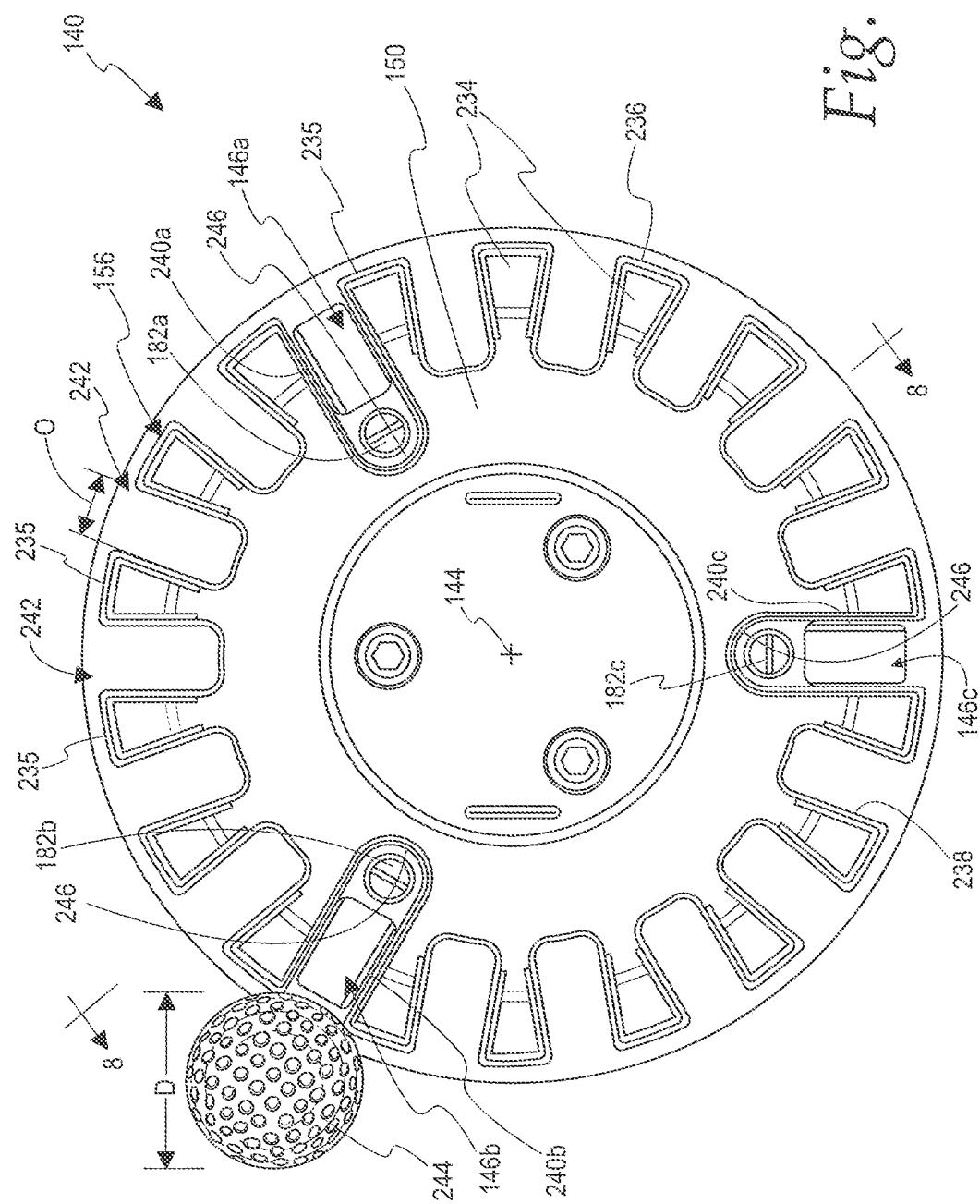
FIG. 7 is a bottom view of the rotary vegetation cutting unit in FIGS. 5 and 6.

In one exemplary application, as seen by looking particularly at FIGS. 6, 7, and 10, the carrier 12 is a robotic unit mounted on wheels 248 for cutting grass on a golf facility, such as a course or range. One or more of the vegetation cutting units 140 are mounted as shown in FIG. 10 to increase the swath width cut as the carrier 12 is advanced. As shown in FIG. 6, the plate 158 has a radial dimension greater than that of the component 150 by a dimension X. As a result, upon encountering a sitting golf ball, the plate 158 will initially contact the golf ball 244. If complete deflection away from the cutting unit 140 does not occur, the golf ball 244 will tend to move radially inwardly and contact the component 150. As this occurs, adjacent fingers 234 will engage the golf ball 244 adequately to reposition it by a turning motion induced by the advancing carrier. This repositioning is also facilitated by the edges bounding the region between the fingers which tend to grip a golf ball should a golf ball travel further radially inwardly.

Figure 11:
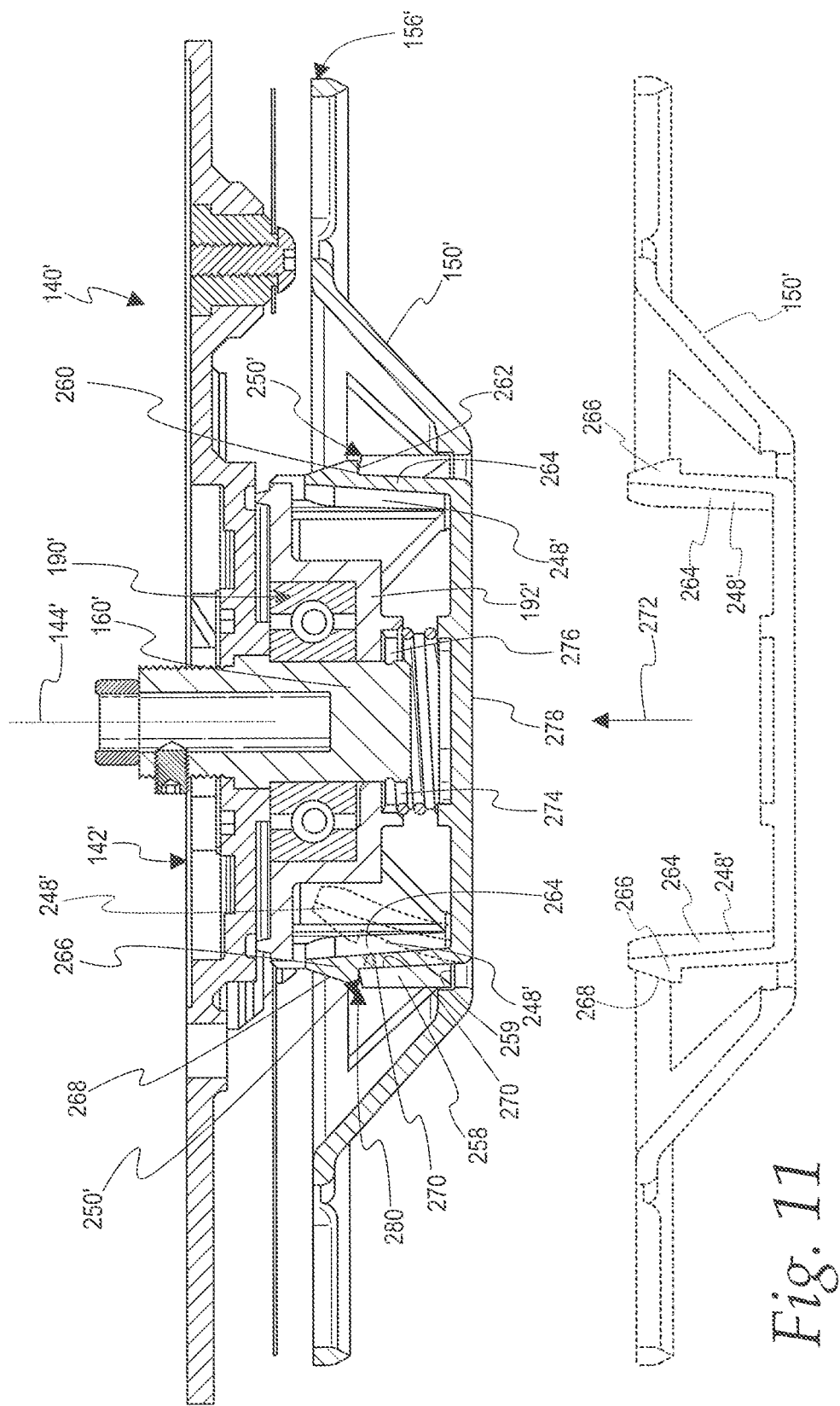
FIG. 11 is a cross-sectional view of a modified form of rotary vegetation cutting unit, according to the invention.

With different embodiments, including an additional embodiment in FIG. 11, assembly and disassembly of the component 150, 150' is facilitated compared to the handling of corresponding components in the prior art constructions, described above. The component 150 is releasably held in place by cooperating connectors on the frame 142 and component 150. As noted above, for purposes of the description and claims herein, the bearing holder 192 is considered to be a movable part of the frame 142.

With the component 150 operatively positioned on the frame 142, in this embodiment three cooperating connector pairs can be manipulated to fix the component 150 in its operative position or allow release and full separation thereof from the frame 142.

In the depicted embodiment, there are three like connectors 248 associated with/on the component 150 that cooperate one each with three connectors 250 on the frame 142.

In this embodiment, the connectors 248 are in the form of threaded bolts, with the connectors 250 each being an internally threaded bore.

Figure 8:
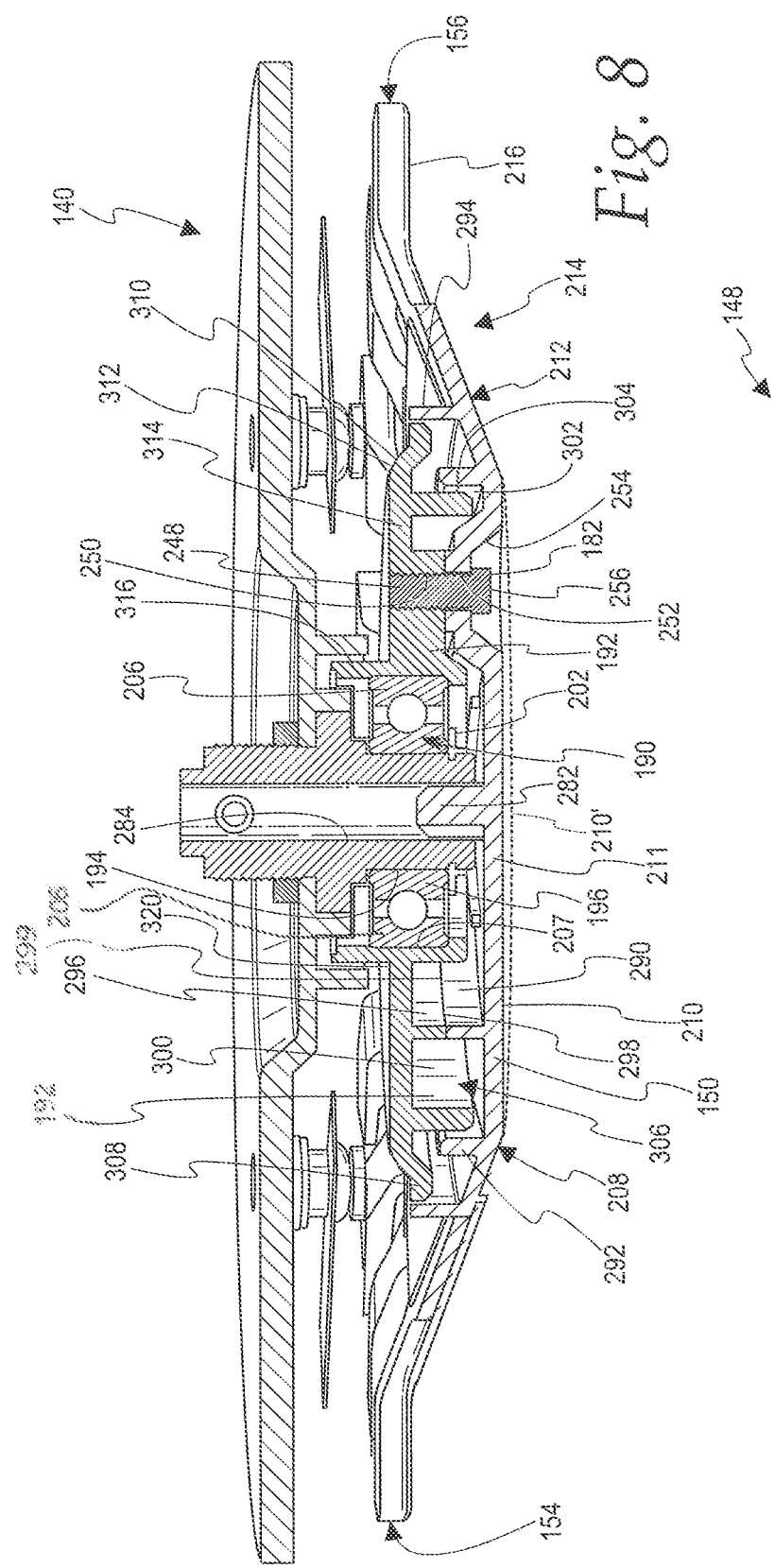
FIG. 8 is a cross-sectional view of the rotary vegetation cutting unit taken along line 8-8 of FIG. 7.

In FIG. 5, the connectors 248, 250 are in a released state. In FIG. 8, the connectors 248, 250 are shown in a secured state with the connectors 248 turned to be tightened in the threaded connectors 250.

With the component 150 in the operative position on the frame 142 and the connectors 248, 250 in their secured states, the component 150 is releasably maintained in the operative position.

With the component 150 in the operative position on the frame 142 and the connectors 248, 250 in their released states, the component 150 can be axially drawn away from the frame 142.

The connectors 248, 250 can be changed between their secured and released states with the component 150 remaining in its operative position.

While three connector pairs are disclosed, any number of connector pairs might be utilized.

Further, while the axes of the connectors 248 in the secured state are substantially vertical and aligned with the operating axis 144, a different orientation is contemplated, with operating from the bottom region of the vegetation cutting unit 140 preferred.

The component 150 has a through opening 252 at each connector location and a radially enlarged recess 254 around each opening 252 at a bottom entry location. Each recess 254 is formed so that each connector head 182 may be fully recessed so that the bottom surface 256 of each connector 248 is flush with the bottom surface portion 210 or spaced slightly thereabove, making the connectors less prone to abrasive alteration in use.

Further, the recessed configuration is such that the heads 182 may be configured to accept a socket which does not require any discrete opening that might be clogged by debris during operation.

In FIG. 11, a modified form of component 150' and bearing holder 192' are shown on another form of the inventive cutting unit, which permit a snap connection between the component 150' and the frame 142'. Placing the component 150' in a releasably maintained operative position on the frame 142', and separation of the operatively connected component 150' from the frame 142', may be effected without handling fasteners that are separate from these parts.

In this embodiment, the holder 192' has a depending, annular, outer wall 258 at which connectors 250' are formed and which nests in a complementary annular seat 259 on the component 150' to positively maintain axial coincidence of the frame 142' and component 150'. The component 150' has integrally formed connectors 248'.

Each of the cooperating connectors 248', 250' makes up a connector pair. It is possible to have a single connector pair; however, preferably multiple connector pairs (2-5) are provided at circumferentially spaced locations around the operating axis 144'.

The connector 250' on the frame 142' has a first locking surface 260. The connector on the component 250' has a second locking surface 262.

Each of the connectors 248' is in the form of an upwardly projecting, bendable arm 264 carrying the second locking surface 262. In this embodiment, the arms 264 are integrally formed with the remainder of the component 150'.

Each arm 264 has an enlarged head 266 with a camming surface 268 thereon. Each camming surface 268 is configured to interact with a camming surface 270 on the frame 142'.

With the component 150' aligned relative to the frame 142' in the dotted line, pre-assembly position in FIG. 11, and each of the connectors 248' angularly aligned with a cooperating connector 250' on the frame 142', the component 150' is advanced axially upwardly in the direction of the arrow 272. Of course, it is not critical that one of the frame 142' and component 150' be held as the other is moved relative to the other as long as relative axial movement occurs that allows the frame 142' and component 150' to be pressed against each other.

As the frame 142' and component 150' make contact, additional relative axial movement causes the camming surfaces 268, 270 to interact, whereupon continued relative movement progressively bends the arms 264 radially inwardly to a flexed position, as shown in dotted lines, to allow the second locking surface 262 to move axially up to and past the first locking surface 260 at each connector pair. At this moment: a) the component 150 is in its operative position; b) the arms 264 on the connectors 248' are in their flexed positions; and c) the connectors 248', 250' are in released states. The loading force in the arms then changes the arms from the flexed positions into the solid line holding positions. As this occurs, the heads 266 spring radially outwardly which puts the first and second locking surfaces 260, 262 in facing/confronting relationship and the connectors 248', 250' in their holding states.

To enhance the connection, a biasing component 274, in this embodiment in the form of a coil spring, is interposed between a snap ring 276 on the frame shaft 160' and the bottom wall portion 278 of the component 150', whereupon the spring force must be overcome to place the first and second locking surfaces 260, 262 in confronting relationship. Once the flexed arms move back to the holding positions, the spring force causes the first and second locking surfaces 260, 262 to be biased more positively against each other.

Accordingly, the first and second locking surfaces 260, 262 are placed in confronting relationship as an incident of the component 150 moving from the pre-assembly position in dotted lines in FIG. 11 to the solid line position, representing the operative position for the component 150'.

Openings 280 are provided at each connector pair location whereby a user can contact each of the heads 266, with the arms 264 in their holding position, and manually press the heads 266 radially inwardly to the flexed position for the arms whereupon the locking surfaces 260, 262 are no longer in confronting relationship and the component 150 can be separated from the operative position. In other words, the manual repositioning of the arms 264 changes the connectors 248', 250' from their secured states back into their released states.

A simple snap connection is thereby facilitated between the frame 142' and component 150' that can be effected by simply relatively axially moving the frame 142' and component 150', from an initially separated relationship, against each other until the component 150' assumes its operative position on the frame 142'.

As noted above, any number of connector pairs might be utilized with the snap connection design. Further, the invention contemplates that the bendable arm(s) might be on either or both of the frame 142' and component 150'.

Additional features of the invention will now be described, as seen most clearly in FIGS. 5 and 8.

To facilitate consistent location of the component 150, a locating stud 282 is formed thereon and projects axially upwardly at the center of the component 150. The stud 282 moves in a complementarily-shaped opening 284 in the bottom of the shaft 160.

Further, the bearing holder 192 has at least one peripheral surface contour 286 matched to a surface 288 on the component 150 so that the component 150 can be placed fully into its operative position on the frame 142 only with the holder 192 and component 150 in a predetermined angular orientation. This feature also potentially creates a stronger connection between the holder 192 and component 150 by keying the holder 192 and component 150 against relative turning around the axis 144. This feature also places the assembled holder 192 and component 150 in a consistent angular relationship wherein the openings 252 on the component 150 align with the connectors 250 on the bearing holder 192.

As noted above, the prior art designs are such that debris, including moisture, may move in a straight line path from externally of the unit to the bearing guiding a respective debris deflecting component. This straight line path may be a direct path or one that extends between components.

To minimize such migration into the bearing components, the invention contemplates preferably that the bearing 190 have a sealed construction.

Additionally, the component 150 and holder 192 are constructed to interact to create a circuitous, non-straight path that foreign matter must travel to move from anywhere externally of the unit to against the bearing 190.

One manner of interfering with debris flow is to have an axial overlapping relationship between portions of the holder 192 and component 150.

The component 150 has at least one, and as depicted multiple, axial projections that block debris passage radially towards the bearing 190.

As seen in FIGS. 5 and 8, one of these axial projections is in the form of a ring 290 that extends around the operating axis 144.

A second axial projection is provided in the form of a second ring 292 spaced from and extending around the ring 290.

A third ring 294 extends around the ring 292 to perform this blocking function with the multiple redundancy compounding the change in path direction required to radially traverse the unit to arrive at the bearing.

The holder 192 also has axial projections that cooperate with the component 150 to block passage of the debris radially towards the bearing.

As seen in FIG. 5, the holder 192 has an axially projecting ring 296 with a downwardly facing surface 298 that abuts to an upwardly facing surface 299 on the ring 290 on the component 250, potentially fully around the axis 144.

The holder has another axially projecting ring 300 which axially overlaps the component ring 292. Radially oppositely facing surfaces 302, 304, respectively on the component 150 and holder 192, are in confronting relation and may be in intimate contact to create seal.

This arrangement creates a closed annular volume 306 between where the pairs of axially projecting components on the component 150 and holder 192 interact.

The holder 192 also has an annular outturned flange 308 with an upper surface 310 with an annular surface portion 312 that declines in a radially outward direction to direct debris gravitationally away from the axis 144.

As depicted, the holder 192 has an upper wall 314 that is contiguous with the outturned flange 308 and extends radially inwardly to a cylindrical shape 316 extending upwardly from a flat surface portion 320 on the wall 314.

These blocking structures may all be incorporated as shown or used individually or in different combinations to perform a shielding function for the bearing 190.

In a preferred form, the component 150' is likewise made from a single, non-metal piece.

If multiple pieces are used to define the component 150, 150', preferably at least one single piece thereon extends from at or adjacent the bottom of the rotary cutting unit 140, 140' radially outwardly to define at least a part of the blocking edge assembly 156, 156'. The single piece has a contiguous surface extending from at or adjacent the bottom of the cutting unit 140, 140' to radially outwardly up to the blocking edge assembly 156, 156'.

The foregoing disclosure of specific embodiments is intended to be illustrative of the broad concepts comprehended by the invention.

The invention claimed is:

1. A rotary vegetation cutting unit having a top and bottom and comprising:
   a frame having a shaft that is driven to cause the frame to move around an operating axis as the rotary vegetation unit is operated;
   at least one cutting element that moves with the frame around the operating axis to sever vegetation as the rotary vegetation cutting unit is operated and advanced in a cutting path along underlying terrain; and
   a debris blocking assembly on the frame and comprising at least one component defining a unitary part that moves relative to the frame in opposite directions around the operating axis,
   the unitary part having a portion extending radially outwardly from the operating axis further than the at least one cutting element and configured to deflect away from the at least one cutting element objects approaching the at least one cutting element in a radial direction as the rotary vegetation unit is advanced in a cutting path,
   the rotary vegetation cutting unit further comprising a bearing assembly including: a) a bearing that guides movement between the unitary part and the shaft; and b) a holder for the bearing that moves together with the unitary part around the operating axis,
   the bearing comprising an inner race and an outer race and axially captive between the holder and the frame,
   the rotary vegetation cutting unit configured so that any debris spaced radially from the rotary vegetation cutting unit is required to traverse a non-straight path to contact the bearing.

2. The rotary vegetation cutting unit according to claim 1 wherein the bearing is a sealed bearing.

3. The rotary vegetation cutting unit according to claim 1 wherein the inner race is on the shaft and the outer race is on the holder.

4. The rotary vegetation cutting unit according to claim 1 wherein the unitary part and holder have axially overlapping portions.

5. The rotary vegetation cutting unit according to claim 1 wherein the unitary part has an axial projection that blocks debris passage radially towards the bearing.

6. The rotary vegetation cutting unit according to claim 5 wherein the unitary part has a first axial projection in the form of a first ring extending around the operating axis and blocking passage of debris radially towards the bearing.

7. The rotary vegetation cutting unit according to claim 6 wherein the unitary part has a second axial projection in the form of a second ring extending around the first ring and blocking passage of debris radially towards the bearing.

8. The rotary vegetation cutting unit according to claim 7 wherein the unitary part has a third axial projection in the form of a third ring extending around the second ring and blocking passage of debris radially towards the bearing.

9. The rotary vegetation cutting unit according to claim 5 wherein the holder has a surface configured to cooperate with a surface on the unitary part and key the holder and unitary part against relative turning around the operating axis.

10. The rotary vegetation cutting unit according to claim 5 wherein the holder has an axial projection that cooperates with the unitary part to block passage of debris radially towards the bearing.

11. The rotary vegetation cutting unit according to claim 1 wherein the holder has an axial projection that cooperates with the unitary part to block passage of debris radially towards the bearing.

12. The rotary vegetation cutting unit according to claim 1 wherein the unitary part and holder are configured to cooperate to define a closed volume surrounding the bearing.

13. The rotary vegetation cutting unit according to claim 1 wherein the unitary part has an axial projection that cooperates with an axial projection on the holder to block passage of debris radially towards the bearing.

14. The rotary vegetation cutting unit according to claim 13 wherein the axial projections on the unitary part and holder have axially facing surfaces that abut.

15. The rotary vegetation cutting unit according to claim 13 wherein the axial projections on the unitary part and holder have radially facing surfaces that abut.

16. The rotary vegetation cutting unit according to claim 15 wherein the radially facing surfaces are complementarily curved.

17. The rotary vegetation cutting unit according to claim 1 wherein the holder has an annular outturned flange.

18. The rotary vegetation cutting unit according to claim 17 wherein the annular outturned flange has an annular surface portion that declines in a radially outward direction.

19. The rotary vegetation cutting unit according to claim 17 wherein the holder has a wall with an annular upwardly facing surface that connects between the annular surface portion that declines and an annular outer surface on a cylindrical shape extending upwardly from the wall and around the bearing.

20. The rotary vegetation cutting unit according to claim 1 wherein the holder is guided in turning around the operating axis relative to a driven part of the frame and fixedly connected to the unitary part so that the unitary part follows movement of the holder.

21. The rotary vegetation cutting unit according to claim 1 wherein the unitary part extends from at or adjacent the bottom of the rotary cutting unit and has an outer edge portion defining at least part of a blocking edge assembly that is configured to deflect away from the at least one cutting element objects approaching the at least one cutting element in a radial direction as the rotary vegetation cutting unit is advanced in a cutting path.

22. The rotary vegetation cutting unit according to claim 21 wherein the unitary part defines at least part of a guide surface that guides the rotary vegetation cutting unit against and past underlying terrain and/or an object on underlying terrain as the rotary vegetation cutting unit is advanced in a cutting path.

23. The rotary vegetation cutting unit according to claim 21 in combination with a carrier for the rotary vegetation cutting unit on which the rotary vegetation cutting unit is guidingly movable in a vertical path while maintaining a constant orientation, where the guide surface extends angularly upwardly and outwardly away from the bottom of the rotary vegetation cutting unit to define a wedging region, whereby an object encountering the wedging region exerts a wedging force upon the guide surface tending to move the rotary vegetation cutting unit upwardly on the carrier.

24. A rotary vegetation cutting unit having a top and bottom and comprising:
- a frame having a shaft that is driven to cause the frame to move around an operating axis as the rotary vegetation unit is operated;
- at least one cutting element that moves with the frame around the operating axis to sever vegetation as the rotary vegetation cutting unit is operated and advanced in a cutting path along underlying terrain; and
- a debris blocking assembly on the frame and comprising at least one component defining a unitary part that moves relative to the frame in opposite directions around the operating axis,
- the unitary part configured to deflect away from the at least one cutting element objects approaching the at least one cutting element in a radial direction as the rotary vegetation unit is advanced in a cutting path,
- the rotary vegetation cutting unit further comprising a bearing assembly including: a) a bearing that guides movement between the unitary part and the shaft; and b) a holder for the bearing on the frame,
- the rotary vegetation cutting unit configured so that any debris spaced radially from the rotary vegetation cutting unit is required to traverse a non-straight path to contact the bearing,
- wherein the unitary part has an axial projection that projects in one axial direction that cooperates with an axial projection on the holder that projects axially oppositely to the one axial direction to block passage of debris radially towards the bearing.

25. The rotary vegetation cutting unit according to claim 24 wherein the axial projections on the unitary part and holder have axially oppositely facing surfaces that abut.

26. The rotary vegetation cutting unit according to claim 24 wherein the axial projections on the unitary part and holder have radially oppositely facing surfaces that abut.

* * * * *